US009544190B2

(12) United States Patent
Baskwill

(10) Patent No.: US 9,544,190 B2
(45) Date of Patent: Jan. 10, 2017

(54) APPLICATION CONFIGURATION USING DNS-BASED SERVICE DISCOVERY

(71) Applicant: Avaya Inc., Basking Ridge, NJ (US)

(72) Inventor: Geoffrey L. Baskwill, Almonte (CA)

(73) Assignee: Avaya Inc., Basking Ridge, NJ (US)

( * ) Notice: Subject to any disclaimer, the term of this patent is extended or adjusted under 35 U.S.C. 154(b) by 391 days.

(21) Appl. No.: 13/930,619

(22) Filed: Jun. 28, 2013

(65) Prior Publication Data
US 2015/0006687 A1    Jan. 1, 2015

(51) Int. Cl.
*G06F 15/16* (2006.01)
*H04L 12/24* (2006.01)

(52) U.S. Cl.
CPC ....... *H04L 41/0816* (2013.01); *H04L 41/0843* (2013.01)

(58) Field of Classification Search
CPC ............ H04L 61/1511; H04L 29/12066; H04L 61/1541; H04L 67/02; H04L 67/10; H04L 67/42; H04L 41/0816; H04L 41/0843; H04L 29/12113; H04N 21/8586; G06F 17/30864
See application file for complete search history.

(56) References Cited

U.S. PATENT DOCUMENTS

| | | | |
|---|---|---|---|
| 2006/0195297 A1* | 8/2006 | Kubota et al. | 702/187 |
| 2006/0262801 A1* | 11/2006 | Sargent | H04L 41/0253 370/401 |
| 2009/0259715 A1* | 10/2009 | Xiao et al. | 709/203 |
| 2011/0191226 A1* | 8/2011 | Ngo et al. | 705/35 |
| 2012/0303762 A1* | 11/2012 | Geiser | G06F 9/4416 709/219 |
| 2013/0312079 A1* | 11/2013 | McCallum | 726/10 |
| 2014/0089478 A1* | 3/2014 | Seed | H04W 4/001 709/222 |
| 2014/0214958 A1* | 7/2014 | Cheshire | 709/204 |
| 2014/0337530 A1* | 11/2014 | Amishav et al. | 709/226 |
| 2015/0088982 A1* | 3/2015 | Johnson et al. | 709/203 |
| 2015/0089061 A1* | 3/2015 | Li et al. | 709/226 |

OTHER PUBLICATIONS

S. Cheshire, M. Krochmap "IETF Request for Comments 6763", Feb. 2013.*

* cited by examiner

*Primary Examiner* — Ranodhi Serrao

(57) ABSTRACT

System and method of application configuration using DNS-based service discovery, the method including: determining a network domain of a user; retrieving PTR, SRV and TXT records from a DNS server associated with the network domain; enumerating service instances based upon the retrieved PTR, SRV and TXT records; receiving a selection of a service instance from the user; constructing a service instance URL from the selected service instance; attempting to retrieve a settings file by use of the service instance URL; and applying configuration settings from the retrieved settings file.

20 Claims, 4 Drawing Sheets

206

308

APPLICATION CONFIGURATION USING DNS-BASED SERVICE DISCOVERY

BACKGROUND

Field of the Invention

Embodiments of the present invention generally relate to automated application configuration, and, in particular, to a system and method for using DNS to retrieve application configuration settings.

Description of Related Art

Telecommunication network endpoints need to register with a call server in order to establish service. Certain basic information is needed by telecommunication network endpoints in order for the endpoints to attempt registration with their associated call server. The basic information may include server addresses, communication domains (e.g. SIP domain), QoS marking values, server and CA certificates, and other low-level settings. The basic information may also be referred to as application configuration data. Application configuration data commonly includes information related to data connectivity, communication settings, and the like. Application configuration data does not include user preference information such as cosmetic settings (e.g., language, colors, window placement, sound muting, etc.).

Currently, application configuration involves either manual configuration or configuration based on contacting a single defined access point. An access point usually is a URL (i.e., web address) at which the application is pre-configured to query for configuration information. For example, Microsoft Outlook defines an auto-configuration mechanism based on constructing a specific URL for retrieving configuration details based on the user's email address. This is deficient in that many companies have complex requirements necessitating more than a single configuration for deployed applications. For example, a large company may have multiple domains nationwide, each with its own configuration requirements.

Endpoint service discovery provides useful information to configure deployed applications with respect to services that are available to the endpoint. Conventional methods of endpoint service discovery rely upon usage of Dynamic Host Configuration Protocol ("DHCP", RFC-2131), and Link Layer Discovery Protocol ("LLDP") to discover initial options. However, a problem arises for endpoints running in a restricted environment where they do not have access to low-level operating system capabilities. Such endpoints cannot create raw sockets (i.e., a socket that receives all DHCP packets), and thus the endpoints have no access to DHCP or LLDP. Furthermore, endpoints may be running outside an enterprise, and therefore the endpoints have no administrator to set DHCP values. As more soft clients and applications emerge, and as endpoints start to be deployed outside the enterprise, there is a growing need to provide an enhanced mechanism that works regardless of how the endpoint is connected to the network.

SUMMARY

Embodiments in accordance with the present invention provide a system and method of application configuration using DNS-based service discovery, the method including: determining a network domain of a user; retrieving PTR, SRV and TXT records from a DNS server associated with the network domain; enumerating service instances based upon the retrieved PTR, SRV and TXT records; receiving a selection of a service instance from the user; constructing a service instance URL from the selected service instance; attempting to retrieve a settings file by use of the service instance URL; and applying configuration settings from the retrieved settings file.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
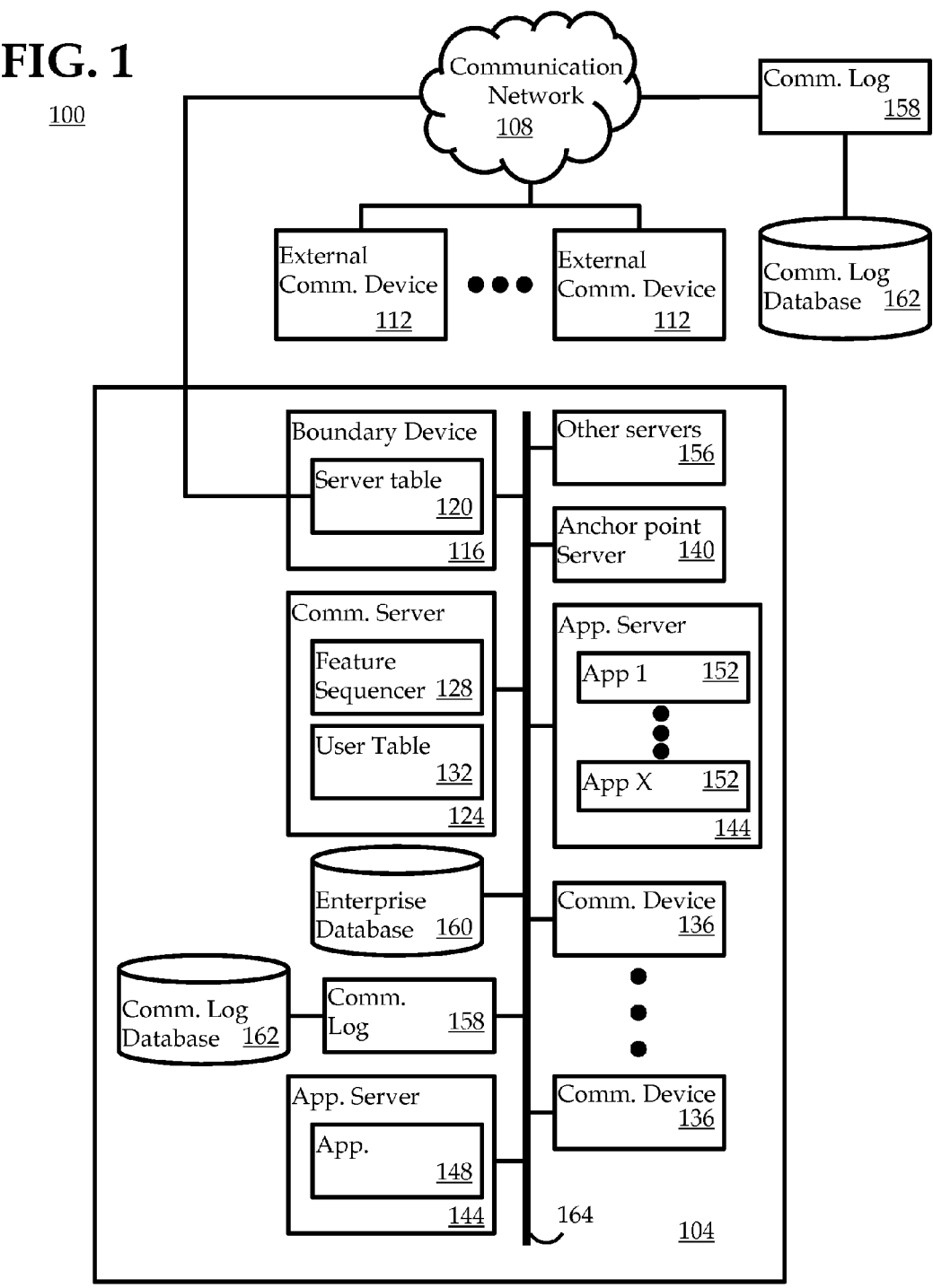
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any application in which it is desirable to utilize an automated process for configuring an application. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The content of RFC-2131, RFC-2782, RFC-1035, RFC-6762 and RFC-6763 are hereby incorporated by reference in their entirety.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144.

Embodiments in accordance with the present invention use DNS-based discovery in order to provide administrators with the flexibility to support a plurality of configuration profiles for a population of users. In contrast, the known art utilizes a single configuration profile and provides a relatively cumbersome process to deploy multiple configuration profiles because there is no way for the end user to easily enumerate the available configuration profiles. Embodiments in accordance with the present invention allow users to easily discover and select from a menu of configuration profiles appropriate for the intended usage. For example, separate configuration profiles may be provided for production vs. trial systems, location of the user or client, place of connection to the network (e.g., work or home), user's type of network terminal (e.g., laptop or desktop or smartphone), user's permission levels, and so forth. Embodiments in accordance with the present invention may be referred to herein as configuration discovery. The configuration data itself is stored in a file pointed to by the URL derived from the SRV and TXT records. Alternatively, the configuration data may be dynamically generated and provided by a web service that is pointed to by the URL derived from the SRV and TXT records. There is a logical hierarchy to DNS but there is also a delegation of authority. The PTR records must exist in the DNS that is authoritative for the domain; they may point to SRV and TXT records that are defined in other domains.

Configuration discovery in accordance with an embodiment of the present invention is a process performed by the endpoint to enumerate the set of configuration profiles that are available to the end user. When multiple configuration profiles exist, the end user may select a profile and the endpoint will automatically retrieve the configuration profile information, apply the configuration profile information to its internal settings, and use the configuration profile information in order to reach the communication server. This can be applied to other non-communication-related applications which require configuration information in order to operate.

Domain Name System ("DNS") is a distributed database and server system primarily known for the purpose of looking up the IP-address that corresponds to a given host name, but DNS may also used for other retrieval tasks. For example, standard DNS functions may be used for service discovery. When used for service discovery, a client may query a discovery mechanism (e.g., a DNS server) for a list of services that implement an available functionality and then pick one of the returned services for interaction. A service may implement one or more functions. As an example from object-oriented programming, a class may implement multiple interfaces. As an example from another industry entirely, an automotive mechanic shop (i.e., a service) may perform inspection as well as repair services (i.e., functions). The client may intend to limit the query to a predetermined context, for example, a client might want to ask not for all shopping services, but for shopping services at a predetermined URL or domain (e.g., amazon.com). DNS can associate various kinds of Resource Records with a predetermined domain. For example, A-records (RFC-1035) may be used for address lookup, MX-records (RFC-1035) may be used for mail server lookup, record type SRV (RFC-2782) for service location, TXT type (RFC-1035) for arbitrary text data, and PTR type (RFC-1035) for expressing a reference to another domain. A combination of the SRV, TXT and PTR record types may be used to provide service discovery capabilities with DNS. DNS-based service discovery is described more fully in RFC-6763. Server 144 and database 160 depicted in FIG. 1 may be usable as a DNS.

SRV resource records are used to identify to the hosts and ports within a zone that a certain service is accessible. SRV records are limited with respect to service lookup, in that SRV records cannot be used to configure named instances of a service type and SRV records support only a single service per host and port combination. For example, it is not possible to configure SRV records for two search services that run in the same Web application and therefore share a common host and port. In addition, SRV records do not support a configuration of metadata for a specific service instance.

The ability to use DNS for other retrieval tasks is utilized by embodiments to retrieve application configuration information. The PTR, SRV, and TXT records on the DNS server are used in combination to enumerate a set of configuration profile URLs, each of which references the location of a configuration profile. The configuration information is retrieved from the configuration profile URL, which references a static file or a web service that provides the configuration information. Embodiments in accordance with the present invention provide a system and method to assemble a set of configuration profiles created and managed by a system administrator, to allow a user to select a desired configuration profile, and then to automatically complete a configuration of an application based on the selected configuration profile. In addition, the use of DNS functions provides significant flexibility to administrators in providing location-specific configuration profiles. Optionally, the set of configuration profiles may include selections that provide highly-available load-balanced services providing the configuration data. Exemplary DNS PTR, SRV, and TXT records in accordance with an embodiment of the present invention are illustrated below in Table 1.

TABLE 1

```
; PTR record
_avaya-ep-config._tcp.example.com. \
    PTR Avaya\032Endpoints._avaya-ep-config._tcp.example.com.
; SRV, TXT records
Avaya\032Endpoints._avaya-ep-config._tcp.example.com. 86400 IN \
    SRV 0 1 443 server.example.com.
    TXT "txtvers=1" "proto=https" "path=/settings.txt"
; A, AAAA records
server.example.com. 86400 IN \
    A 192.0.2.2
    AAAA ::ffff:c000:0202
```

A DNS-based service discovery mechanism in accordance with an embodiment of the present invention may used with existing standard IT practices, such as round-robin load balancing and redundancy, location-aware name resolution (i.e., GeoDNS), and "split-horizon" (i.e., serving different DNS records to clients based on whether they are inside or outside the enterprise firewall).

Embodiments in accordance with the present invention do not require usage of Domain Name System Security Extensions ("DNSSEC"), but rather rely on server authentication to help ensure that endpoint communications are not compromised. However, some embodiment may use DNSSEC as an option to provide an additional measure of security.

Prior to practicing embodiments of the invention, the endpoint should be initialized for network connectivity. In particular, the operating system of the endpoint first may perform authentication to attach the endpoint to a network (e.g., WiFi Wireless Encryption Protocol, "WEP"). Next, the endpoint operating system may perform an LLDP probe to acquire network configuration information. Next, the operating system may perform a DHCP probe to acquire bootstrap configuration data.

An exemplary DNS-Based Service Discovery process in accordance with an embodiment of the present invention to construct a URL to retrieve the settings file may proceed by first asking for, or otherwise retrieving, domain information for the user (e.g., "example.com"). Next, performing service instance enumeration to look for PTR records in the domain. If more than one service instance is returned, picking one by, e.g., user selection. Next, retrieving SRV and TXT records for the selected service instance. Next, constructing the URL from the data retrieved in the previous step (e.g., https://config-server.example.com/settings.txt). Next, retrieving and processing the settings file stored at the constructed URL, resulting in an A/AAAA record lookup. Optionally, in more complex DNS deployments, there may be separate zone file information for each defined zone. This could be used to provide a different settings file to internal versus external users, users in different locations, or otherwise deal with complex deployment scenarios.

Figure 2:
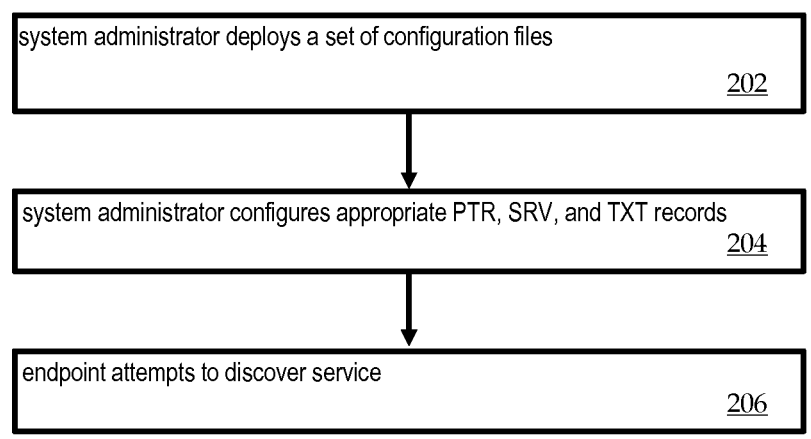
FIG. 2 illustrates at a high level of abstraction a DNS-based process in accordance with an embodiment of the present invention.

FIG. 2 illustrates at a higher level of abstraction a DNS-based process 200 in accordance with an embodiment of the present invention. In order to support DNS-Based Service Discovery, embodiments of a method may first perform a preparatory step 202 by having a system administrator deploy a set of configuration files, one configuration file per desired configuration profile. The configuration profiles may be deployed either as static files on a web server or as dynamic web services providing the configuration profile information to the endpoint. The configuration profiles may be protected by standard authentication and authorization mechanisms.

Next, as another preparatory step 204, the system administrator should configure appropriate PTR, SRV, and TXT records that point to the configuration files, in accordance with the general structures defined in the DNS-Based Service Discovery standard (RFC-6763). The content of the PTR, SRV, and TXT record set for each configuration profile should be such that, when combined together in accordance with embodiments of the invention, will result in the URL of the configuration profile. The DNS records are stored on the DNS service that is authoritative for the user domain.

After the preparatory steps 202 and 204, process 200 moves on to step 206, at which endpoints 112 of system 100 attempt to discover service in accordance with an embodiment of the present invention.

Figure 3:
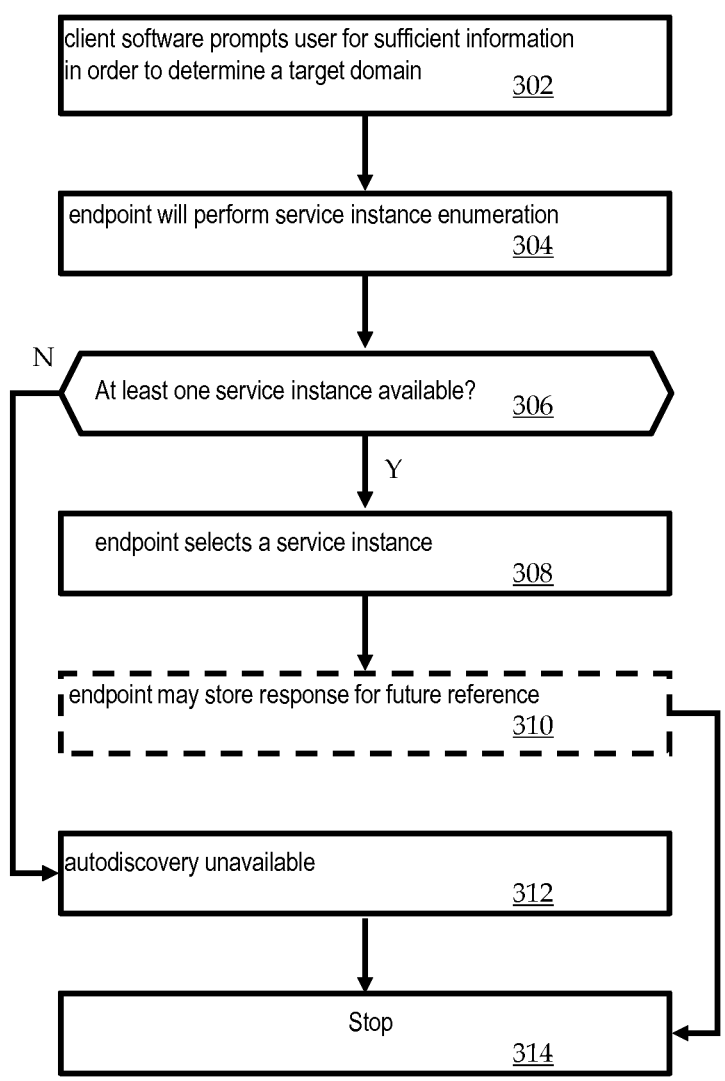
FIG. 3 illustrates at a relatively lower level of abstraction a DNS-based process in accordance with an embodiment of the present invention.

FIG. 3 illustrates at a lower level of abstraction the process of step 206. First, at step 302, the client software in endpoints 112 prompts the user for sufficient information (e.g., an email address) in order to determine a target domain. If the user has multiple email addresses, the user will select or will be informed which email address to provide in order to use DNS service discovery. Generally, the address used will be related to the purpose for using DNS service discovery, e.g., a work-related email address would be used to set up the user's work endpoint.

Next, at step 304, the endpoint will perform service instance enumeration as described in RFC-6763. More particularly, after receiving the user's information for use in determining a target domain, and after determining the target domain based upon this information, the client software in the endpoint uses the target domain identification to enumerate a set of configuration profiles using the administrator-provisioned DNS records from step 202. The service instance enumeration step 304 issues a query for services of a predetermined type in a predetermined logical domain, and receives in response a list of named instances. The service instance enumeration is provided in response to a request for PTR records of the hypothetical form "_config._tcp.domain.", in which the domain parameter is retrieved from the endpoint configuration.

Next, at step 306, endpoint 112 will check whether at least one service instance is available. If the result of step 306 is positive, then control of process 206 transfers to step 308. If the result of step 306 is negative, then control of process 206 transfers to step 312.

At step 308, endpoint 112 will select a service instance. If the user has stored a preference, and if the preferred service instance is available, then the endpoint may automatically select that preferred service instance. If the user has stored a preference, and if the preferred service instance is not available or is unreachable, the endpoint will notify the user that their preferred service is unavailable and ask the end user to select from the enumerated service instances. If the user has not stored a preference and multiple service instances are provided in the service instance enumeration, the endpoint may ask the end user to select from the enumerated service instances. If the user has not stored a preference and only one service instance is provided in the service instance enumeration, the endpoint may automatically select that service instance. In all cases, the user of endpoint 112 is also provided an option by which to manually enter a settings file URL or a configuration.

Next, at optional step 310, endpoint 112 may store the response for future reference. This may be useful when the selected instance was not a previously-stored user preference. Once the embodiment accepts and processes the selected service instance (either as a previously-stored preference or by the user's selection), the client software in endpoint 112 downloads and installs the appropriate configuration profile.

Next, at step 312 if no settings file was retrieved and downloaded, endpoint 112 should indicate that autodiscovery is unavailable. In some embodiments, the user optionally may be asked to provide a settings file URL. If the user provides a settings file URL, endpoint 112 will attempt to retrieve the URL following standard procedures and process the resulting document as a settings file. If, after attempting to use the user-supplied URL, endpoint 112 is still lacking sufficient settings required for operation (excluding login credentials), endpoint 112 should ask the end user to provide the required settings manually, and allow the user to manually enter settings into the application.

Figure 4:
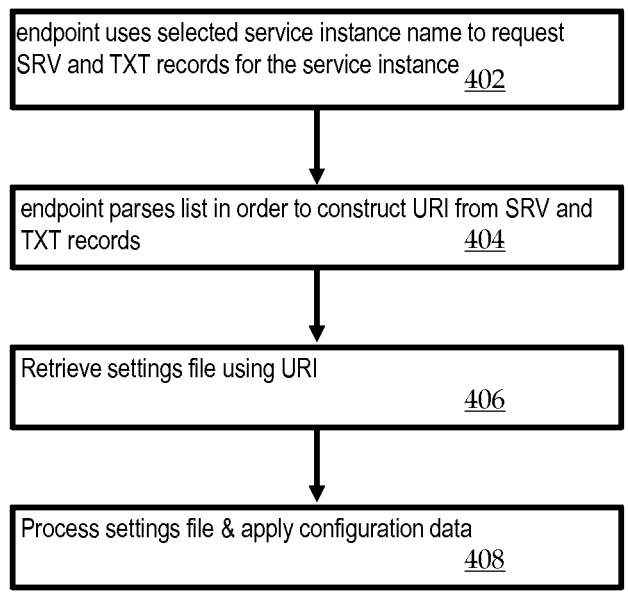
FIG. 4 illustrates a process for endpoint selection and usage of a configuration file in accordance with an embodiment of the present invention.

FIG. 4 illustrates the process of step 308 at a lower level of abstraction. At step 402, endpoint 112 will use the selected service instance name to request SRV and TXT records for the service instance as described in DNS-Based Service Discovery (RFC-6763). The SRV records will be processed as described in RFC 2782, with the result being an ordered list of (server name, port number) tuples. The TXT records will be processed as described in Section Six of RFC-6763, resulting in a list of data attributes as described in RFC-6763. The data attributes are used to encode the components of the URL referencing the configuration profile. The DNS administrator is responsible for creating the PTR, SRV, and TXT records with values that will result in the configuration profile URLs being properly constructed.

Next, at step 404, the endpoint will iterate through the ordered list of (server name, port number) tuples, parsing the list in order to attempt to retrieve the URL constructed by concatenating "<protocol>://<server name><:port number><path>". If <port number> is 0, the port number will be omitted from the URL to allow standard processing.

Next, at step 404, URL retrieval will follow the standard procedures for the defined protocol, specifically including procedures for responding to authentication challenges and procedures for authenticating the server. Iteration through the list of tuples will stop when the URL retrieval at one of the tuples is successful.

Next, at step 408, if the URI retrieval was successful, the resulting document will be processed as a settings file.

Embodiments in accordance with the present invention provide an ability to partition users by sub-domain, since different sub-domains may have different records, thus automatically providing separate settings. Embodiments may offer different service sets for internal vs. external users with split-horizon deployments. In a split-horizon deployment, different service sets may be implemented by providing separate DNS servers facing internally vs. externally.

Embodiments in accordance with the present invention are extensible. New parameters such as a group number may be added to a TXT record. New parameters may be added to a settings file. Furthermore, embodiments provide built-in support (i.e., are extensible) for IPv6 when endpoints are ready.

Although RFC-3263 describes a method for SIP service discovery using SRV records, it omits the browsing mechanism and TXT records defined in DNS-SD. The TXT record is used as described herein for passing additional information like the URL scheme (e.g., "http") and path. The process described in RFC-3263 does not provide an ability to enumerate a set of profiles, nor does it provide the additional information that exists in the TXT records, which is used for creating URLs for the configuration profile.

In some embodiments in accordance with the present invention, the system administrator may deploy a configuration service instead of configuration files. A configuration service is known as a service that provides configuration profile information, typically in a dynamic fashion tailored to the individual end user. An advantage of using a configuration service is that a service would allow usage of more complex logic in order to provide dynamic or per-user configuration data rather than static configuration profiles.

In some embodiments in accordance with the present invention, the administrator may use geographic DNS ("GeoDNS") resolution to define different records and profile sets for different regions. For example, the user's approximate geographic location will be inferred (e.g., through IP address), and then the GeoDNS will provide application configuration information (i.e., DNS records) that is appropriate for the inferred geographic location. The DNS records enumerate a set of configuration profiles that are relevant to the inferred geographic location. The DNS administrator configures the GeoDNS rules.

Optionally, a fully qualified domain name may be provided in a configuration file, but the mapping to a host server may be resolved differently, depending on geographic location. In this option, two different users who are inferred to be in different parts of the world may receive the same configuration data, but the configuration data would be resolved differently depending on where those two different users are inferred to be in the world.

Embodiments of the present invention include a system having one or more processing units coupled to one or more memories. The one or more memories may be configured to store software that, when executed by the one or more processing unit, allows practice of embodiments described herein, at least by use of processes described herein, including at least in FIGS. 2-4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method of configuring an application on an endpoint device by use of DNS-based service discovery of available configuration profiles, comprising:
   determining, by the endpoint device, a target network domain for a user;
   retrieving, by the endpoint device, PTR records from a DNS server associated with the target network domain, wherein each PTR record is associated with one of a plurality of service instances and each service instance is associated with a respective SRV record and TXT record, wherein each of the plurality of service instances corresponds to a respective configuration profile from among the available configuration profiles for configuring the application;

enumerating, by the endpoint device, the plurality of service instances based upon the retrieved PTR records;

receiving, by the endpoint device, a selection of one of the enumerated service instances from the user;

retrieving, by the endpoint device, the SRV and TXT records associated with the selected service instance;

constructing, by the endpoint device, a service instance Uniform Resource Locator (URL) for the selected service instance based on a scheme and a path contained in the TXT record associated with the selected service instance;

requesting, by the endpoint device, a settings file referenced by the constructed service instance URL, the requested settings file comprising application configuration settings; and after receiving the requested settings file, applying, by the endpoint device, the application configuration settings from the requested settings file to configure the application.

2. The method of claim 1, wherein the TXT record comprises a group number.

3. The method of claim 1, further comprising:
the step of limiting the constructed service instance URL to a predetermined context.

4. The method of claim 1, wherein the step of retrieving PTR records comprises:
a location-aware name resolution process.

5. The method of claim 1, wherein the DNS server comprises a split-horizon DNS server.

6. The method of claim 1, wherein the DNS server is further associated with a predetermined zone within the network domain.

7. The method of claim 1, wherein the DNS server is configured to return a first set of PTR, SRV and TXT records to a user on an internal side of a firewall, and a second set of PTR, SRV and TXT records to a user on an external side of a firewall.

8. The method of claim 1, wherein the constructed service instance URL references a dynamic web service.

9. The method of claim 1, wherein the constructed service instance URL references a static file.

10. The method of claim 1, wherein when the requested settings file is not received, querying, by the endpoint device, the user for alternative application configuration settings.

11. The method of claim 1, wherein when the requested settings file is not received,
retrieving, by the endpoint device, a locally stored set of application configuration settings; and
applying, by the endpoint device, the locally stored set of application configuration settings.

12. The method of claim 1, wherein the step of enumerating service instances comprises:
issuing, by the endpoint device, a query for services of a predetermined type in a predetermined logical domain of the target network domain; and
receiving, by the endpoint device in response to the query, a list of service instances to be enumerated.

13. The method of claim 1, wherein the retrieved SRV and TXT records associated with the selected service instance comprises a plurality of related SRV records, and
wherein constructing the service instance URL and requesting the settings file comprise:

constructing, by the endpoint device, an ordered list of tuples based on the plurality of related SRV records, wherein each tuple comprises a server name and port number; and iterating through the ordered list of tuples until a URL retrieval at one of the tuples is successful by:
constructing, by the endpoint device, the service instance Uniform Resource Locator (URL) based on the tuple and on the scheme and the path contained in the retrieved TXT record; and
requesting, by the endpoint device, the settings file referenced by the constructed service instance URL, the requested settings file comprising application configuration settings.

14. A system to configure an application on an endpoint device by use of DNS-based service discovery of available configuration profiles, comprising:
a memory storing executable instructions;
a processor of the endpoint device in communication with the memory, wherein the executable instructions when executed by the processor cause the processor to:
determine a target network domain for a user;
retrieve PTR records from a DNS server associated with the target network domain, wherein each PTR record is associated with one of a plurality of service instances and each service instance is associated with a respective SRV record and TXT record,
wherein each of the plurality of service instances corresponds to a respective configuration profile from among the available configuration profiles for configuring the application;
enumerate the plurality of service instances based upon the retrieved PTR;
receive a selection of one of the enumerated service instances from the user;
retrieve the SRV and TXT records associated with the selected service instance;
construct a service instance Uniform Resource Locator (URL) for the selected service instance based on a scheme and a path contained in the TXT record associated with the selected service instance;
request a settings file referenced by the service instance URL, the requested settings file comprising application configuration settings; and
after the requested settings file is received, apply the application configuration settings from the requested settings file to configure the application.

15. The system of claim 14, wherein the TXT record comprises a group number.

16. The system of claim 14, wherein the endpoint device is configured to use a location-aware name resolution process.

17. The system of claim 14, wherein the DNS server is configured to return a first set of PTR, SRV and TXT records to a user on an internal side of a firewall, and a second set of PTR, SRV and TXT records to a user on an external side of a firewall.

18. The system of claim 14, wherein the executable instructions when executed by the processor cause the processor to:
retrieve a locally stored set of application configuration settings, when the requested settings file is not received.

19. The system of claim 14, wherein the executable instructions, when executed by the processor, cause the processor to:

issue a query for services of a predetermined type in a predetermined logical domain of the target network domain; and receive in response to the query, a list of service instances to be enumerated.

20. The system of claim 14, wherein the retrieved SRV and TXT records associated with the selected service instance comprises a plurality of related SRV records, and wherein the executable instructions when executed by the processor cause the processor to:

construct an ordered list of tuples based on the plurality of related SRV records, wherein each tuple comprises a server name and port number; and iterate through the ordered list of tuples until a URL retrieval at one of the tuples is successful by:

constructing the service instance Uniform Resource Locator (URL) based on the tuple and on the scheme and the path contained in the retrieved TXT record; and requesting the settings file referenced by the constructed service instance URL, the requested settings file comprising application configuration settings.

\* \* \* \* \*